United States Patent
Kaminsky et al.

(10) Patent No.: US 7,639,625 B2
(45) Date of Patent: Dec. 29, 2009

(54) TRACING CONNECTION PATHS THROUGH TRANSPARENT PROXIES

(75) Inventors: Daniel Kaminsky, Sunnyvale, CA (US); Arivu Ramasamy, San Jose, CA (US); Martin Cieslak, Northville, MI (US); Mukund Ingle, Saratoga, CA (US); Siddharth Vajirkar, San Jose, CA (US); Etai Lev Ran, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

(21) Appl. No.: 11/713,138

(22) Filed: Mar. 2, 2007

(65) Prior Publication Data
US 2008/0212484 A1 Sep. 4, 2008

(51) Int. Cl.
*H04L 12/26* (2006.01)
(52) U.S. Cl. ............................... 370/248; 709/227
(58) Field of Classification Search ................ 370/248, 370/242, 243, 244, 249, 254, 389, 392, 503, 370/395.52, 238, 351; 709/238, 227
See application file for complete search history.

(56) References Cited

U.S. PATENT DOCUMENTS

| | | | | |
|---|---|---|---|---|
| 5,802,320 A | * | 9/1998 | Baehr et al. | 709/249 |
| 7,305,473 B2 | * | 12/2007 | Vogt | 709/227 |
| 2002/0199172 A1 | * | 12/2002 | Bunnell | 717/128 |
| 2008/0080507 A1 | * | 4/2008 | Swallow et al. | 370/392 |
| 2008/0126794 A1 | * | 5/2008 | Wang et al. | 713/151 |

OTHER PUBLICATIONS

M. Baugher et al., "The Group Domain of Interpretation", IETF RFC 3547, Jul. 2003.
D. Wallner et al., "Key Management for Multicast: Issues and Architectures", IETF RFC 2627, Jun. 1999.
M. Baugher et al, "Multicast Security (MSEC) Group Key Management Architecture", IETF RFC 4046, Apr. 2005.
T. Hardjono et al., "The Multicast Group Security Architecture", IETF RFC 3740, Mar. 2004.

* cited by examiner

*Primary Examiner*—Brian D Nguyen
(74) *Attorney, Agent, or Firm*—Cindy Kaplan

(57) ABSTRACT

In one embodiment, a method for tracing a connection path from a source node to a destination node through a network having one or more transparent proxies includes generating a trace packet at the source node, transmitting the trace packet over the network towards the destination node, and receiving trace response packets in response to transmission of the trace packet. The trace response packets include a packet from the destination node and a packet from each of the transparent proxies in a data path from the source node to the destination node. Each of the packets from the transparent proxies includes an identifier of the transparent proxy transmitting the packet. The method further includes identifying the transparent proxies in the connection path based on information in the trace response packets. An apparatus for tracing a connection path is also disclosed.

14 Claims, 5 Drawing Sheets

TRACING CONNECTION PATHS THROUGH TRANSPARENT PROXIES

BACKGROUND OF THE INVENTION

The present disclosure relates generally to tracing a connection path in a communication network.

Connection tracing is used in a network to identify problem areas and provide detailed information about the network. A connection trace may be used to determine why connections to a given server might be poor, and can often identify the location of problems in cases of instability or other malfunction. TraceRoute is an example of a tool that is used to trace the route of a packet over each hop from a client to a remote host by reporting all router addresses therebetween.

Typically, route tracing programs such as TraceRoute utilize Internet Protocol (IP) packets. In a first IP packet, a Time to Live (TTL) field is set to 1. Whenever an IP packet reaches a router, the TTL field is decremented by the router. When a router detects that the TTL value has reached 0, it sends an Internet Control Message Protocol (ICMP) time exceeded or timeout message back to the source node. By sequentially increasing the TTL field and monitoring the returning ICMP timeout messages, a source node can discover an IP route.

Due to widespread use of firewalls on computer networks, many of the packets that conventional route tracing utilities send out end up being filtered, making it impossible to completely trace the path to the destination. Even if ICMP is allowed at the firewalls, TraceRoute does not follow and report on transparent redirections. Thus, when transparent proxies are in place it is difficult to determine the entities located in the client to server connection path.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method for tracing a connection path from a source node to a destination node through a network having one or more transparent proxies includes generating a trace packet at the source node, transmitting the trace packet over the network towards the destination node, and receiving trace response packets in response to transmission of the trace packet. The trace response packets include a packet from the destination node and a packet from each of the transparent proxies in a data path from the source node to the destination node and on a return path (from destination node to the source node). Each of the packets from the transparent proxies includes an identifier of the transparent proxy transmitting the packet. The method further includes identifying the transparent proxies in the connection path based on information in the trace response packets. An apparatus for tracing a connection path is also disclosed.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
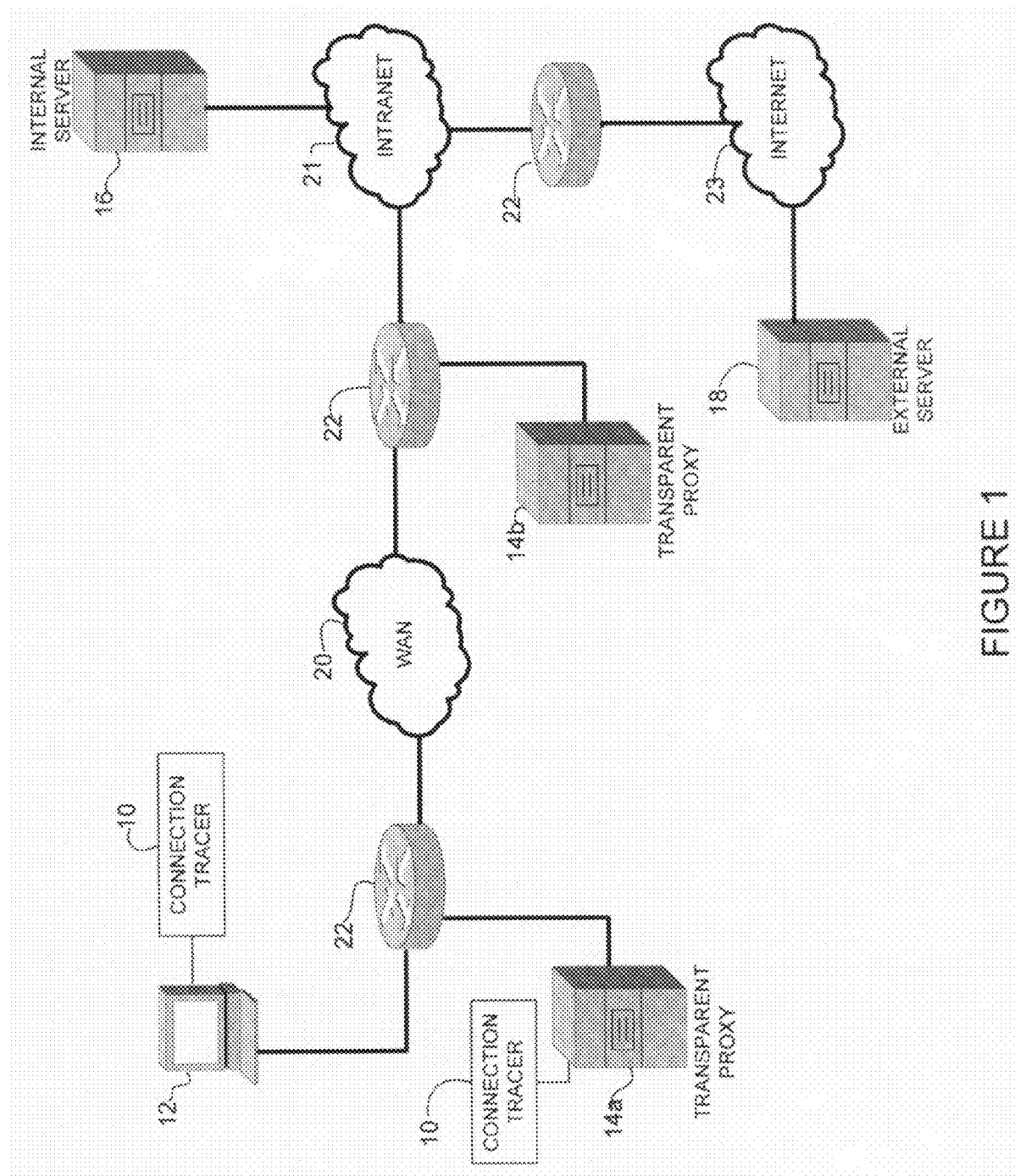
FIG. 1 illustrates an example of a network in which embodiments described herein may be implemented.

Referring now to the drawings, and first to FIG. 1, an example of a network that may implement embodiments described herein is shown. The embodiments operate in the context of a data communication network including multiple network elements. For simplification, only a small number of nodes are shown. Some of the nodes in a network that employs the embodiments may be network devices such as routers, switches, servers, or user devices. The network device may include, for example, a master central processing unit (CPU), interfaces, and a bus. The CPU preferably includes memory and a processor. The network device may be implemented on a general purpose network host machine such as a computer system or network device described below with respect to FIG. 5.

The system and method described herein for tracing connection paths may be used at different nodes in the network. For example, a connection trace application (connection tracer) 10 may be implemented at a client device 12 or a transparent proxy 14a, 14b. In the example shown in FIG. 1, the client 12 is in communication with one or more servers (e.g., internal server 16, external server 18) through a WAN (wide area network) 20 and a plurality of routers or switches 22. The internal server 16 is in communication via an Intranet 21 and the external server 18 is in communication via the Internet 23. The connection tracer 10 may be used, for example, to identify a connection path between a source node (e.g., client 12) and a destination node (e.g., server 18). The source and destination nodes may be any type of host having a data communication capability. It is to be understood that the network shown in FIG. 1 is only one example, and that other network configurations and network devices may be used without departing from the scope of the invention.

The connection trace system 10 is used to augment a protocol stream with an operation that carries sufficient data to determine an actual path in a network, including paths containing a transparent proxy. The method and system may be used by proxy servers or as a utility at other network devices for various applications, including the analysis of a data path taken by requests passing through proxies, due to transparent interception and redirection. The method and system described herein may also be used for discovering network topology. For example, the transparent proxies may be the destination nodes in the trace connection process.

Figure 2:
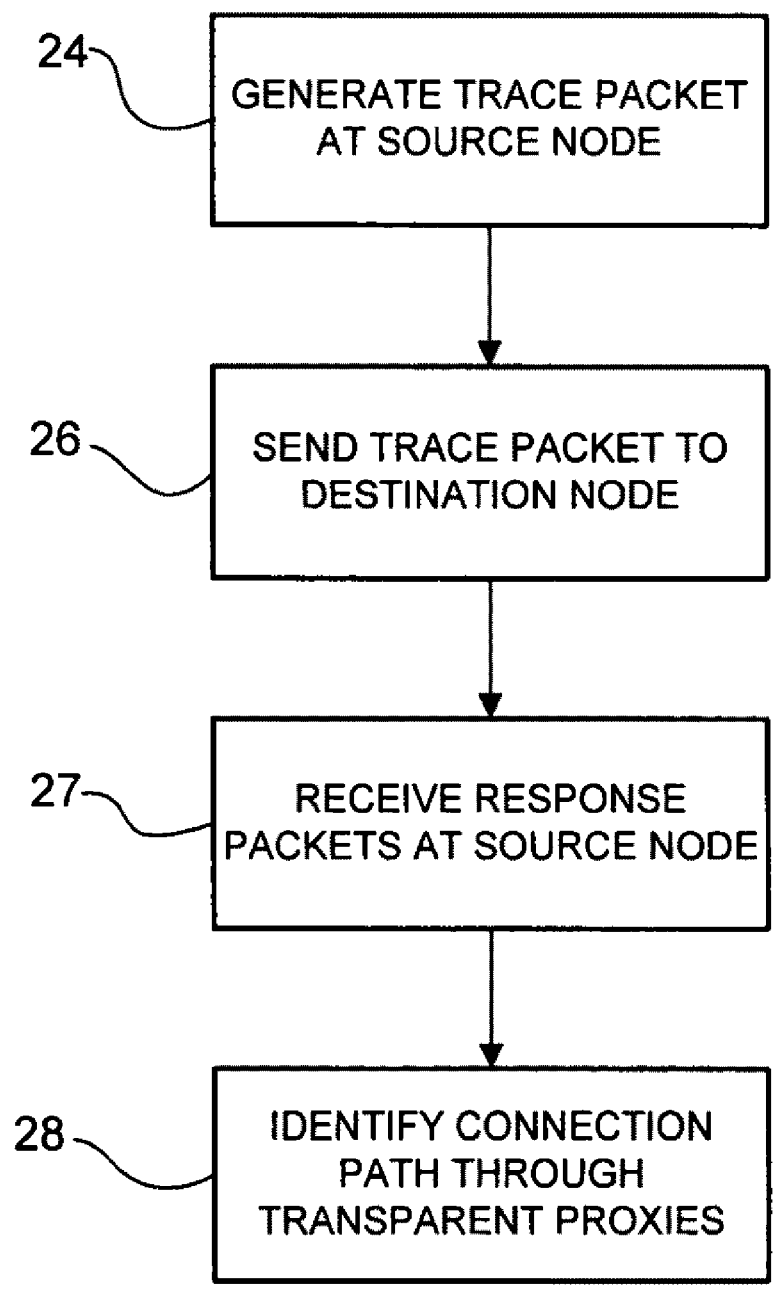
FIG. 2 is a flowchart illustrating a process for tracing connection paths through transparent proxies in accordance with one embodiment.

FIG. 2 is a flowchart illustrating an overview of one embodiment of a process for tracing a connection path through transparent proxies at a source node. At step 24 the source node (e.g., client 12 or proxy 14a, 14b) generates a trace packet. The trace packet is sent out over a communications network to a destination node (e.g., server 16, 18) (step 26). At step 27, the source node receives a plurality of trace response packets including a packet from each of the transparent proxies located in a data path between the source node and the destination node and a return data path from the destination node to the source node, and a packet from the destination node. Each of the packets received from the transparent proxies include an identifier of the proxy transmitting the packet and an identifier of any transparent proxy located within a data path between the proxy transmitting the packet and the source node, or a counter identifying a location of the transparent proxy within the connection path. The source node then identifies a connection path through the transparent proxies based on information in the trace response packets (step 28).

The connection path may be identified using a layer 4 protocol. In one embodiment, TCP (Transmission Control Protocol) SYN (synchronization) and SYN-ACK (synchronization and acknowledgement) packets are used to trace connection paths, including paths through transparent proxies.

Figure 3:
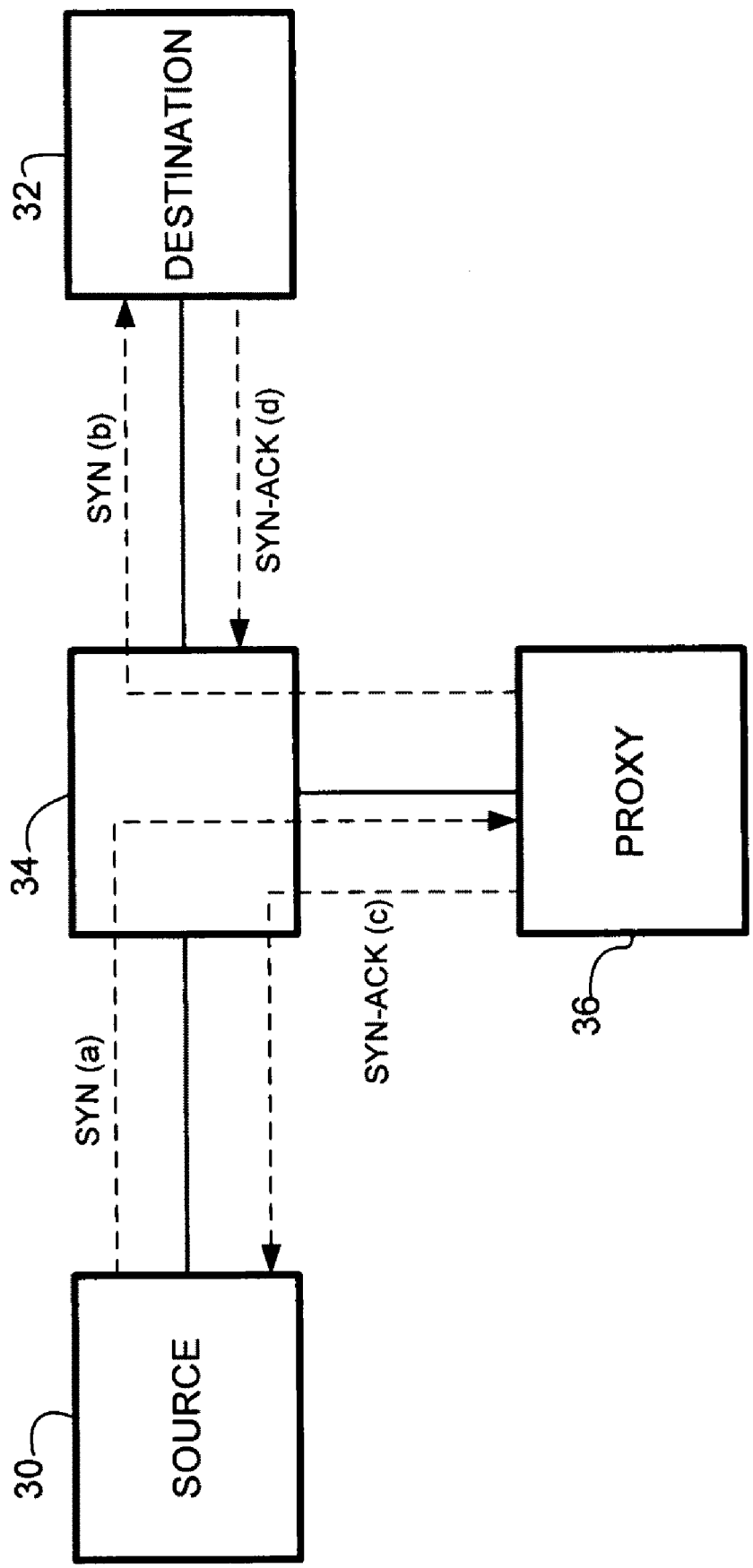
FIG. 3 is a block diagram illustrating an example of packet flow for a connection trace according to one embodiment.

FIG. 3 illustrates an example of packet flow for a connection trace using TCP packets. The trace is initiated at source node 30 for a connection path from the source node to destination node 32. The connection path passes through intermediate node 34 (e.g., router) and transparent proxy 36. The source node 30 initiates a TCP connection towards the destination node 32 by generating and transmitting a TCP packet with the SYN flag set (SYN(a) of FIG. 3). The SYN packet has a trace option enabled in the Options field of the TCP packet header. TCP packets transmitted with the trace option enabled will not impact operation at the destination node 32 if it is not configured to recognize or utilize the trace option, since network devices are typically configured to ignore options that the devices do not understand. This also applies to any intermediate devices that are not configured to recognize the trace option. Thus, network devices, such as routers and switches, which are not operating as a transparent proxy, or a client initiating the trace option, will ignore the TCP Option field.

In addition to the Options field, the header of the TCP packet also includes a Source Port field, which identifies the sending port of the source node 30, and a Destination Port field, which identifies the receiving port of the destination node 32. The header may also include other standard fields of a TCP header (e.g., Sequence number, Acknowledgement number, Data offset, Flags) or other fields which may be used to describe connection configurations. The data portion of the SYN-ACK packet may also be used to carry additional information that does not fit within the TCP Option field. For example, the data field may include a Local ID (local device initiating trace), and New Remote ID (remote device that is responding in a SYN-ACK trace response packet). Identifiers can be well-known (e.g., IP address) or local (e.g., MAC address), in which case a lookup against a database is used, or any other unique identifier.

Referring again to FIG. 3, the packet transmitted from the source node 30 is received at router 34 and transparently redirected to proxy 36 (SYN (a)). The proxy 36 is configured to recognize and respond to the trace option. The proxy 36 replies with a SYN-ACK packet which is sent to the source node 30 (SYN-ACK (c)). The SYN-ACK packet includes a Proxy ID for the transmitting proxy 36 in the data field of the packet.

The proxy 36 also adds its own information to the SYN packet received from the source node 30 and forwards the SYN packet (SYN(b)) to the next hop towards the destination node 32 identified in the destination address field of the SYN packet it received from source node 30. The proxy 36 may add its own IP address or other information to SYN packet and records the information for the received SYN packet. Also, the proxy 36 may increase an uplink proxy counter rather than adding its own IP address. The SYN(b) packet is received at the destination node 32, which does not recognize the trace option and therefore drops the option. The destination node 32 responds with a SYN-ACK packet (SYN-ACK(d)), which is received at the transparent proxy 36 and then forwarded to source node 30 (path not shown for simplification of the drawing). Upon receiving the SYN-ACK(d) packet at proxy 36, the proxy determines whether the TCP SYN-ACK packet has been seen by any other devices by checking for the presence of the TCP trace option. In this example, the trace option is not present so the proxy preferably looks for an association in the TCP SYN packet information previously saved. If one is found, the proxy adds the trace option and its proxy ID. The proxy 36 also inserts an indication that the destination was reached.

When source node 30 receives the SYN-ACK (d) packet from server 32, it knows that the SYN packet that it previously transmitted has reached its destination. The source node 30 uses the information it receives from SYN-ACK packets (c) and (d) to identify the connection path to server 32.

In a network comprising a plurality of nodes and transparent proxies, the source node 30 will receive a plurality of SYN-ACK packets with the trace option set. Each proxy that receives a SYN packet replies with their own SYN-ACK packet, which is transmitted back to the source node 30. When a proxy receives a SYN-ACK packet with the trace option set, it preferably appends its identifier to a list of identifiers and forwards the packet to the source node. The source node 30 collects all of the SYN-ACK packets and uses this information to identify transparent proxies within a connection path.

Figure 4:
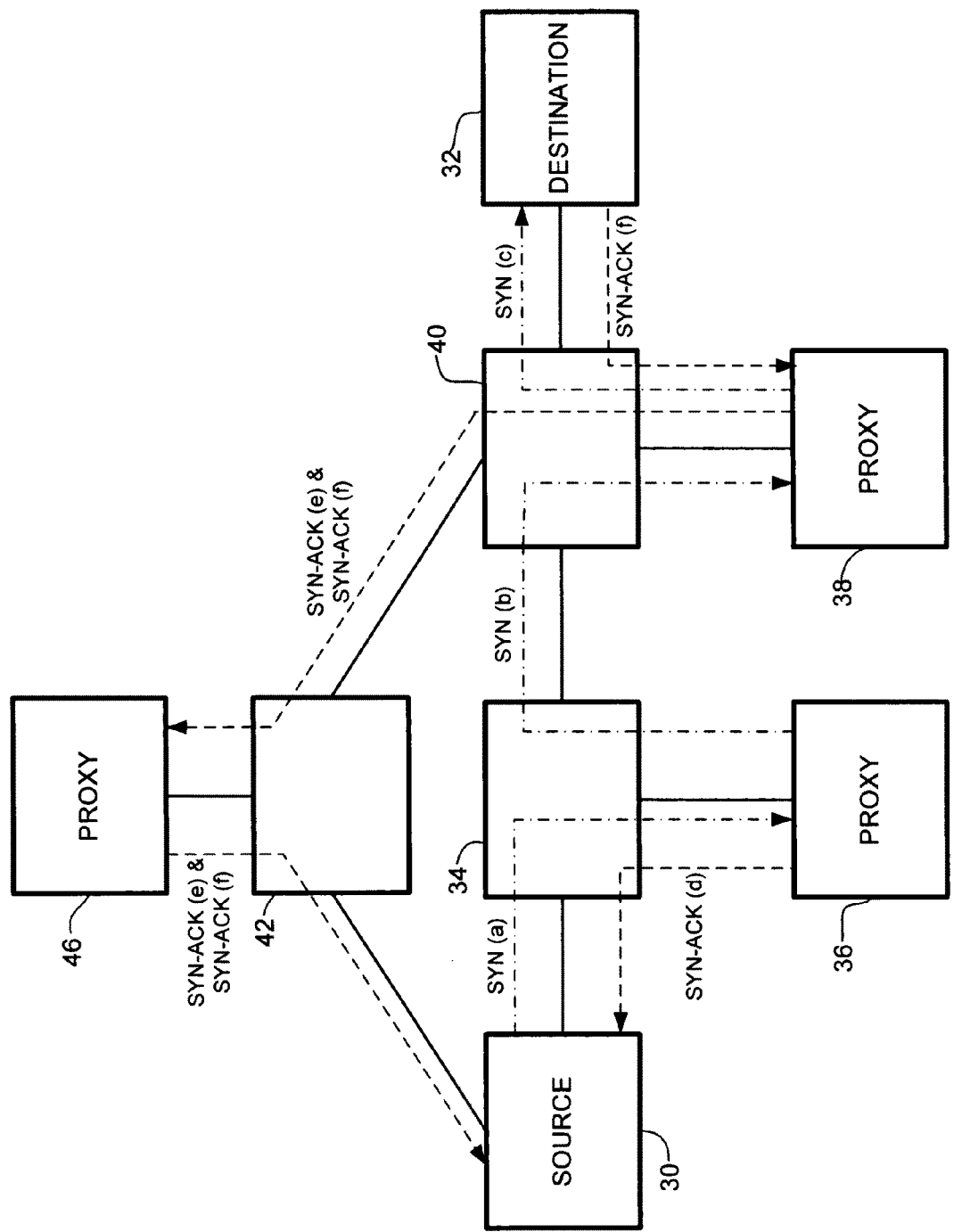
FIG. 4 is a block diagram illustrating an example of packet flow for a connection trace in a network having asymmetric routing, according to one embodiment.

FIG. 4 illustrates the flow of packets used to trace a connection path in which asymmetric routing is used. There are two transparent proxies 36, 38 located in a data path from the source node to the destination node and an additional transparent proxy 46 located in the data path from the destination node to the source node. The source node 30 initiates the trace by transmitting a SYN packet with trace option enabled (SYN (a)). Proxy 36 intercepts the SYN(a) packet, transmits SYN-ACK(d) packet to the source node 30, and transmits SYN(b) in the path to the destination node 32. Proxy 38 intercepts SYN(b) packet, transmits SYN-ACK (e) to the source node 30, and transmits SYN(c) to the destination node 32. The SYN-ACK(e) packet will be intercepted by proxy 46, which will append its identifier in the data field and then send the packet to the source node 30.

Upon receiving SYN(c) packet at the destination node 32, the node transmits SYN-ACK(f) packet without the trace option set. (Since the destination node is not configured to recognize the trace option, it drops the option.) The SYN-ACK(f) packet is sent to router 40. Transparent proxy 38 receives the SYN-ACK(f) packet and determines whether the packet has been seen by any other transparent proxies by checking for the presence of the trace option. The trace option is not present since the packet was sent from the destination node 32 and has not yet passed through any other transparent proxies. The proxy 38 appends its identifier to the data field of the packet and sends it towards the source node 30. In this example, the SYN-ACK(f) packet is routed from router 40 to router 42, where it is intercepted by proxy 46. The proxy 46 appends its identifier to the list in the data field and sends the packet to the source node 30. The source node 30 collects the information from the SYN-ACK packets and uses this information to identify the location of the transparent proxies in the connection path between the source node 30 and destination node 32.

In one embodiment, the SYN and SYN-ACK packets include an upstream counter and a downstream counter that are increased accordingly at each transparent proxy, to provide information as to the relative location and distance from the source and destination nodes. The counters may be used in place of the list of identifiers in the trace response packets. Referring to the example of FIG. 4, the SYN-ACK(e) packet transmitted from proxy 38 would have an upstream counter of 2 since it is the second transparent proxy within the upstream data path and a downstream counter of 1 since it is initiating the SYN-ACK packet.

In another embodiment, hop-by-hop or end-to-end processing may be allowed. If space is limited (e.g., TCP header options), then hop-by-hop can be used with the intermediate path encoded using a digest. This allows iteration by increasing the depth on each iteration and sending the intermediate path. This embodiment may be used to detect different routes.

In another embodiment, the SYN packet initiated at the transparent proxy retains the original source IP address of the initiating client so that the SYN-ACK packets are returned directly to the initiating device rather than passing back through the transparent proxy.

The method described above utilizes TCP SYN packets, however, it is to be understood that other packets or protocols may be used without departing from the scope of the invention. For example, TCP keep-alive packets may be used instead of SYN and SYN/ACK packets. The TCP option is used as described above for the SYN/SYN-ACK packets. The packets may be generated from the source node, for example.

In another embodiment, an HTTP proxy header (or specialized extension header) is used to carry a list of proxies (caching and/or reverse) along the request-response path. The header may piggy-back a pending request or use a new request (e.g., OPTIONS/HEAD request) initiated specifically for connection tracing. The header is added by the first entity on the path (e.g., a client of the caching proxy near it) and each entity along the path appends its identifier to the list. The header value is reported when a response is seen by the initiating entity. Separate headers may be used for upstream or downstream traffic.

Figure 5:
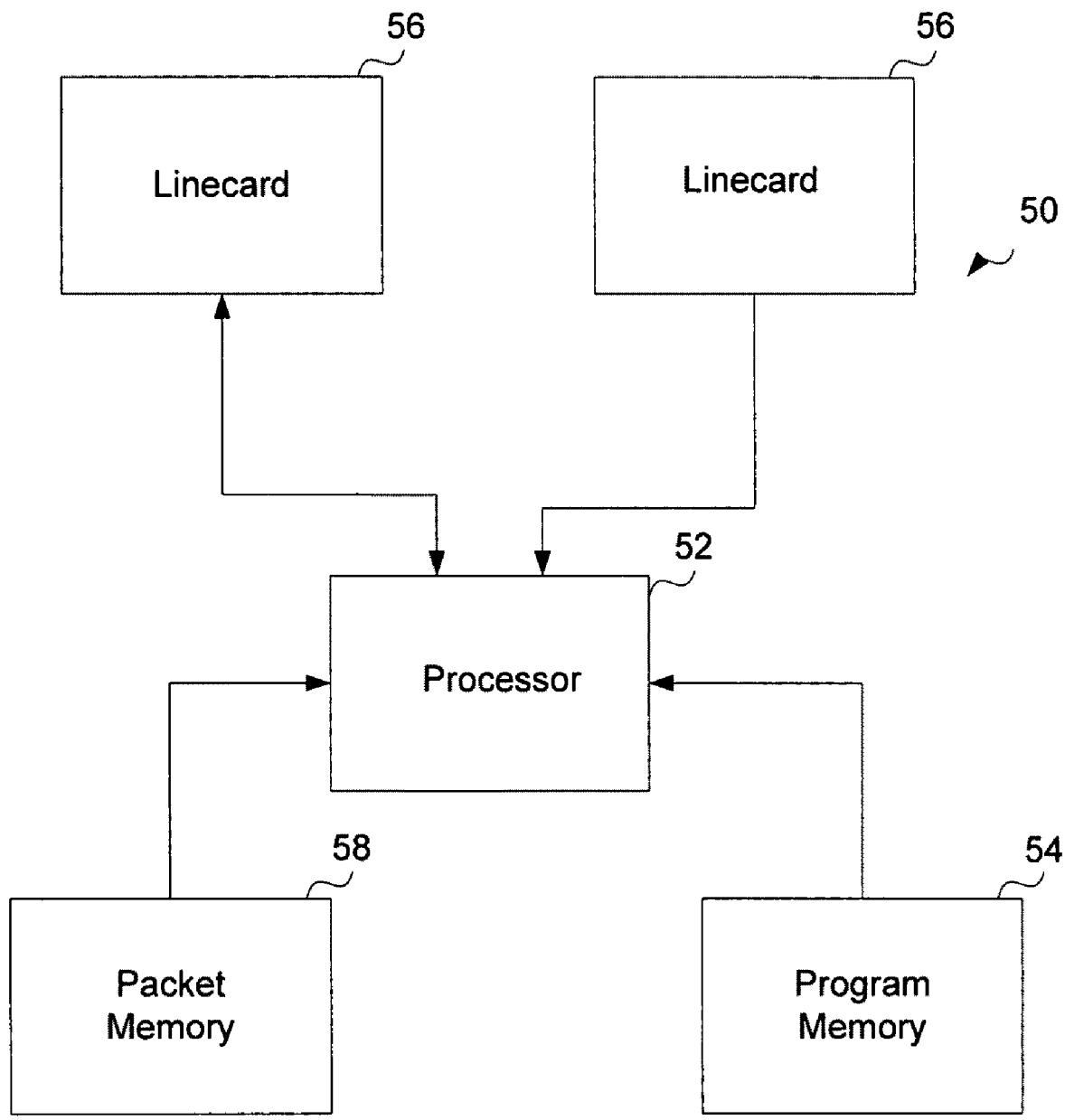
FIG. 5 depicts an example of a network device useful in implementing embodiments described herein.

FIG. 5 depicts a network device 50 that may be used to implement embodiments described herein. In one embodiment, network device 50 is a programmable machine that may be implemented in hardware, software, or any combination thereof. A processor 52 executes codes stored in a program memory 54. Program memory 54 is one example of a computer-readable medium. Program memory 54 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 50 interfaces with physical media via a plurality of linecards 56. Linecards 56 may incorporate Ethernet interfaces, DSL interfaces, Gigabit Ethernet interfaces, 10-Gigabit Ethernet interfaces, SONET interfaces, etc. As packets are received, processed, and forwarded by network device 50, they may be stored in a packet memory 58. To implement functionality according to the system, linecards 56 may incorporate processing and memory resources similar to those discussed above in connection with the network device as a whole.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for tracing a connection path from a source node to a destination node through a network comprising one or more transparent proxies, the method comprising:
    generating a trace packet at the source node;
    transmitting the trace packet over the network towards the destination node;
    receiving a plurality of trace response packets in response to transmission of the trace packet, said plurality of trace response packets comprising:
        a packet from each of said one or more transparent proxies in a data path from the source node to the destination node, each of the packets comprising an identifier of the transparent proxy transmitting the packet; and
        a packet from the destination node; and
    identifying said one or more transparent proxies in said connection path based on information in said plurality of trace response packets.

2. The method of claim 1 wherein each of said trace response packets from the transparent proxies further comprises an identifier of any of the transparent proxies in a data path from the transparent proxy transmitting the packet to the source node.

3. The method of claim 1 wherein transmitting the trace packet comprises utilizing a layer 4 protocol.

4. The method of claim 1 wherein the trace packet is a Transmission Control Protocol (TCP) synchronization packet.

5. The method of claim 4 wherein said plurality of trace response packets comprise TCP synchronization-acknowledgement packets.

6. The method of claim 4 wherein the trace packet comprises a trace option in an options field of a header of the TCP packet.

7. The method of claim 1 wherein said trace response packets from the transparent proxies each comprise a counter identifying a location of the transmitting proxy generating said trace response packet within said connection path.

8. The method of claim 7 wherein said counter comprises an upstream counter and a downstream counter for identifying a location of the transmitting proxy generating said trace response packet in a downstream data path and an upstream data path within said connection path.

9. An apparatus for tracing a connection path from a source node to a destination node through a network comprising one or more transparent proxies, the apparatus comprising a processor configured to generate a trace packet at the source node, transmit the trace packet over the network towards the destination node, receive a plurality of trace response packets in response to transmission of the trace packet, and identify said one or more transparent proxies in said connection path based on information in said plurality of trace response packets; and
    memory for storing connection path information contained within said plurality of trace response packets;
    wherein said plurality of trace response packets comprise a packet from the destination node, and a packet from each of said transparent proxies in a data path from the source node to the destination node, each of the packets from the transparent proxies comprising an identifier of the transparent proxy transmitting the packet.

10. The apparatus of claim 9 wherein each of the trace response packets from the transparent proxies further comprises an identifier of any of the transparent proxies in a connection path from the transparent proxy transmitting the packet to the source node.

11. The apparatus of claim 9 wherein the trace packet is a Transmission Control Protocol (TCP) synchronization packet.

12. The apparatus of claim 11 wherein said plurality of trace response packets comprise TCP synchronization-acknowledgement packets.

13. The apparatus of claim 9 wherein said plurality of trace response packets comprise a counter identifying a location of the transmitting proxy generating said trace response packet within the connection path.

14. A method for tracing a connection path from a source node to a destination node through a network comprising one or more transparent proxies, the system comprising:
    means for generating a trace packet at the source node;
    means for transmitting the trace packet over the network towards the destination node;
    means for receiving a plurality of trace response packets in response to transmission of the trace packet, said plurality of trace response packets comprising:
        a packet from each of said one or more transparent proxies in a data path from the source node to the destination node, each of the packets comprising an identifier of the transparent proxy transmitting the packet; and
        a packet from the destination node; and
    means for identifying said one or more transparent proxies in said connection path based on information in said plurality of trace response packets.

* * * * *